US006256474B1

(12) United States Patent
Gibisch et al.

(10) Patent No.: US 6,256,474 B1
(45) Date of Patent: Jul. 3, 2001

(54) METHOD AND DEVICE FOR CONVEYING A PRE-PRINTED STRIPLIKE RECORDING MEDIUM IN A PRINTING DEVICE

(75) Inventors: Herbert Gibisch, Munich; Wolfram Keil, Poing; Holger Hofmann, Munich; Alex Windhager, Aschau, all of (DE)

(73) Assignee: Oce Printing Systems GmbH, Poing (DE)

(*) Notice: Subject to any disclaimer, the term of this patent is extended or adjusted under 35 U.S.C. 154(b) by 0 days.

(21) Appl. No.: 09/554,005

(22) PCT Filed: Nov. 10, 1998

(86) PCT No.: PCT/EP98/07171

§ 371 Date: May 8, 2000

§ 102(e) Date: May 8, 2000

(87) PCT Pub. No.: WO99/24263

PCT Pub. Date: May 20, 1999

(30) Foreign Application Priority Data

Nov. 10, 1997 (DE) ............................................. 197 49 656

(51) Int. Cl.[7] .......................... G03G 15/00; B65H 23/00; B23Q 15/00

(52) U.S. Cl. ................................. 399/384; 226/2; 226/24

(58) Field of Search ............................... 399/384; 226/24, 226/2, 27, 32; 101/248; 400/579, 580, 581, 706, 708

(56) References Cited

U.S. PATENT DOCUMENTS

| | | | | |
|---|---|---|---|---|
| 3,648,911 | * | 3/1972 | Pekrul . | |
| 3,915,090 | * | 10/1975 | Horst et al. | 101/248 |
| 4,660,082 | | 4/1987 | Tomohisa et al. . | |
| 4,835,720 | | 5/1989 | Ditto et al. . | |
| 4,994,975 | | 2/1991 | Minschart . | |
| 5,204,620 | | 4/1993 | Costanza et al. . | |
| 5,361,960 | * | 11/1994 | Fokos et al. | 226/2 |
| 5,515,088 | | 5/1996 | Carpentier et al. . | |
| 5,951,182 | * | 9/1999 | Weverberg et al. | 400/708 |

FOREIGN PATENT DOCUMENTS

| | | | |
|---|---|---|---|
| 1 937 699 | | 2/1971 | (DE) . |
| 25 26 190 | | 12/1976 | (DE) . |
| 608 904 | | 1/1979 | (DE) . |
| 33 36 792 | | 3/1985 | (DE) . |
| 37 30 097 | | 5/1988 | (DE) . |
| 44 28 156 | | 8/1995 | (DE) . |
| 196 31 747 | | 9/1997 | (DE) . |
| 0 224 820 | | 11/1986 | (EP) . |
| 59-20687 | | 2/1984 | (JP) . |
| 63-103268 | | 7/1988 | (JP) . |
| 5-145753 | | 11/1993 | (JP) . |
| 6-297786 | * | 10/1994 | (JP) . |
| WO 88/00530 | | 1/1988 | (WO) . |
| WO 95/19929 | | 7/1995 | (WO) . |
| WO 97/36211 | | 10/1997 | (WO) . |

* cited by examiner

*Primary Examiner*—Susan S. Y. Lee
(74) *Attorney, Agent, or Firm*—Schiff Hardin & Waite

(57) ABSTRACT

A method and a device for controlling a drive unit which conveys a striplike laterally pre-printed recording medium, whereby a sensor is sensitized with respect to a regularly re-occurring mark of the recording medium. The recording medium is continuously scanned by the sensor during the printing operation and the speed at which the recording medium is conveyed is adjusted according to scanned signals from the sensor.

29 Claims, 10 Drawing Sheets

METHOD AND DEVICE FOR CONVEYING A PRE-PRINTED STRIPLIKE RECORDING MEDIUM IN A PRINTING DEVICE

BACKGROUND OF THE INVENTION

The present invention relates to a method and an apparatus for transporting preprinted web-shaped recording media, particularly of continuous form paper, in an electrographic printing device, in particular. Paper, film material, labels or other materials can be used as the web-shaped recording medium.

The greatest variety of paper grades are employed when printing paper. What is referred to as margin-perforated paper is mainly employed in the electrographic high-performance printer field with printing outputs of more than 40 pages per minute. This paper has lateral holes at its longitudinal edges for transport and for monitoring the position of the paper. It is thereby driven by sprocket tractors that engage into the lateral transport holes. This paper often also has transverse perforations along which the individual pages are separated from one another.

The margin perforation is particularly employed when processing preprinted paper. Given this paper, the information subsequently applied in the electrographic printer, for example data that are printed on a pre-printed form, should come to lie as exactly as possible at predetermined locations of the pre-print. The form can have been preprinted by a printing device of another construction, for instance by an offset printer, or by an identical electrographic printer. For positionally exact printing, the position of the paper web in the conveying direction must be exactly adjusted to or, synchronized with the drive thereof or, the movement of the photoconductor drum.

For exact positioning of such paper, the first page of the paper web is placed exactly at a specific position with respect to the sprocket tractors. A page start mark of the pre-print or, of, the transverse perforation thereby exactly prescribes the beginning of the page. All further pages are automatically exactly positioned due to the constrained guidance by the tractor sprocket when the first page was properly inserted.

The feed of the perforated paper usually occurs in a specific grid corresponding to the hole spacings, for example in a ½ inch grid or in a ⅙ inch grid. The paper web is then not moved continuously but step-by-step by a multiple of the grid spacing.

There is frequently also the demand in the high-performance printing field to be able to employ roll paper that does not comprise such margin perforations in printers for continuous-form paper. Both economic as well as ecological considerations contribute to this demand. When printing margin perforated paper, namely, a processing step wherein the margin strips are removed from the printed page is necessary, whereby the waste that thereby arises must be disposed of.

For example, WO 95/19929 A1 discloses a printer that is suitable for processing roll paper without margin perforation. A first seating edge, which prescribes the lateral position of the paper, as well as stabilization rollers, an underpressure brake and a roller arrangement with a loop-drawing means are provided in this printer for the exact transport of the paper.

Even though continuous form papers both with and without margin perforation can be fundamentally processed with such a device, problems arise when printing forms. When one wishes to process pre-printed paper with such a printer, then no direct allocation of the pre-printed area to the information to be subsequently printed is possible. As a result thereof, the information to be subsequently printed cannot be fitted into the pre-print in positionally correct fashion.

Causes of mispositioning are, for example, fluctuations in the paper length that derive from different ambient temperatures or different degrees of moisture of the paper web. Such fluctuations can amount to up to a few millimeters per page. Deviations in the print image on this order of magnitude are not acceptable when printing forms.

Added thereto given tractor-less friction drives is the problem that the transport precision in the feed direction cannot always be adhered to. For example, slippage between the drive drum and the paper web or manufacturing tolerances of the drive mechanism can contribute thereto.

DE 19 37 699 A likewise discloses a friction drive for data printers. A sensor that recognizes a pre-printed mark at the edge of the form is provided given this drive. A reallocation of the line height to the printing location is undertaken with the sensor result with the respective start of the form. What is disadvantageous about this drive is that a mark adapted to the sensor must be pre-printed at a specific position of the form so that the control function can be implemented.

CH 608 904 A5 teaches an apparatus with which it is possible to write a running band of forms with individual data. For this purpose, a sensor is provided, which detects a particular printed feature in the forms and then triggers the print process within a particular field in the forms. The disadvantage of this apparatus is that, on the one hand, the feature on the forms must have a particular design, for instance a rectangular shape, in order to be reliably detected by the sensor. On the other hand, the measurement accuracy of the sensor strongly depends on which recording medium is used. In particular, the contrast of a mark relative to the background (e.g. to a paper surface) can differ significantly from one recording medium to the next (e.g. given different types of paper).

DE-A-1937699 teaches a method and an apparatus for controlling a drive assembly for a web-shaped recording medium, which has been preprinted in pages in which a sensor is provided for scanning the recording medium. DE-A-2526190 as well as U.S. Pat. No. 4,994,975 and JPA-5902068 teach such methods. It is common to all these methods that they stipulate specific characteristic attributes of the mark, for instance with respect to the color of the mark or the contrast between the mark and its background surface, in order to be able to employ the respectively prescribed sensor. Therefore, the recording medium must be printed in a particular way.

De-A-19631747 teaches an optoelectronic sensor device, which works in conjunction with a light source, for detecting a marking that is known in advance on a web-shaped recording medium in electrographic printing or copying devices as well as a device for controlling the sensor device. It is provided there that the type of measurement method, or respectively, the selection of a required light source, is decided depending on a known mark that is provided on the recording medium.

SUMMARY OF THE INVENTION

It is an object of the invention to set forth a method and an apparatus for controlling a drive for web-shaped recording media with which unspecified preprinted recording media can be transported with positional precision.

This object is achieved according to the invention by providing a method for controlling a drive assembly and an electrographic printer which transports a web-shaped recording medium that has been preprinted in pages. A recording medium is selected which has been preprinted with information arbitrarily in pages. The recording medium is scanned continuously by a sensor during print operation. A regularly recurring mark is selected from the preprinted information or from a surface structure of the recording medium. The sensor is sensitized to the regularly recurring mark of the recording medium by setting sensor parameters. A transport speed of the recording medium is regulated using scanned sensor signals. A device for carrying out the method is also provided.

According to a first aspect of the invention, in order to control a drive assembly that—in an electrographic printer, in particular—transports a web-shaped recording medium that has been preprinted in pages, a sensor is sensitized to a regularly recurring mark of the recording medium by setting sensor parameters. The recording medium is continuously scanned during the print operation using the sensor, and the transport of the recording medium is regulated using the scanned sensor signals.

According to the invention, the selected recording medium can be preprinted arbitrarily in pages. From the preprinted information or from the surface structure of the recording medium, a regularly recurring mark is selected, and the sensor is sensitized to the regularly recurring mark of the recording medium by setting sensor parameters.

In an advantageous exemplifying embodiment of the invention, the marks are selected from the preprinted information of the recording medium, and an optoelectronic sensor is used, in particular. The marks can be located in the print-capable region of the printing device, or, in the region of the placement of forms into which the printer prints individual data. But it is also possible to use a surface structure, particularly a window cutout, as a mark. The method is therefore very flexible. The printer can process arbitrary documents, sensitizing the sensor to the respectively appropriate or prescribed mark information. The mark is applied page by page, in particular, the information thereof being used to control the drive page by page.

To sensitize the sensor, the background information (color, structure, or the like) of the recording medium, on which the form is based, is first scanned before the mark is sought. An advantage of this exemplifying embodiment is that the mark used for the sensitization corresponds precisely to the subsequent forms that are printed on subsequent pages.

In a second aspect of the invention, the sensitization occurs by means of a measurement surface, which is moved automatically or manually from the sensor in an initialization procedure, so that the sensor can scan the marks. For this purpose, either the sample of a currently preprinted mark, or a standardized measurement surface that represents standardized marks can be used. The measurement surface can be constructed as a colored surface (opaque copy) or as a transparent colored film. To measure the background, a measurement surface can be provided which corresponds in particular to the recording medium that is to be inserted (e.g. to a particular paper type). In particular, a sample of the recording medium as a measurement surface can serve this purpose.

In a third aspect of the invention, the contrast between the mark and the background on which the mark is printed is calculated. Several alternative procedures are proposed for this. First, it is possible to determine the contrast with the aid of the mark and/or using the measurement surfaces. Alternatively, it is possible to determine the mark and/or the background on the recording medium directly on the recording medium and to derive the contrast from this.

For sensitization and/or to detect the marks following the first mark detected, the recording medium is first transported with a first, predetermined speed, whereby a window within which the sensor signals are acquired is prescribed, in particular a time window or a number of increments of a step motor. Synchronously with this process or at a time offset, it is checked whether the mark has been detected, or, was detected, within this window, and an error message is output when the mark is not detected within the time window.

A control that is allocated to the sensor can also be fed characteristic data about the mark from outside, particularly in the header area of a print job.

The recording medium is first moved a particular length in the recording direction, in order to sensitize the sensor to the specific mark. If the mark is not found during this forward motion, the recording medium is subsequently moved in the opposite direction. Several such cycles of forward-back movements can be executed, with an adjustment value being changed at the sensor after each cycle. Sensor parameters such as spectral sensitivity can be modified. The position of the sensor in the coverage area can be modified, namely transverse to the transport direction of the recording medium.

It is also advantageous to dispose the sensor such that it can be moved transverse to the recording direction. The mark can then be located at an arbitrary point on the form. It is then possible to use the actual components of the form themselves, such as text, graphics, or window cutouts, as the marks. The sensor according to the invention can thus be adapted to the respective form contents in that it is sensitized to a selected item of information.

In a preferred exemplifying embodiment, the sensor can be color sensitive in particular; the sensitization—that is, the setting of sensor parameters—is performed to particular colors of the background, or respectively, of the mark. Alternatively or in addition, the sensitization of the sensor can be performed with respect to a geometric shape of the marks or with respect to the surface structure of the recording medium web. For instance, the marks can be notches that are provided in the paper webs or window cutouts in the blank forms. A sensor setting value that is computed in the sensitization is advantageously stored and reutilized for later measurements.

The sensitizing of the sensor is preferably performed in that the paper is transported at least once in or against the transport direction, during which process the evaluating unit checks if and when the sensor delivers a signal. It can be provided that at least one cycle of forward and reverse movements be performed, and that after each movement or each cycle, a setting value at the sensor is modified.

In an advantageous development of the invention, the front edge of the preprinted web of the recording medium that is provided with marks is seated in an input region of the printer at a predetermined insertion mark. Next, the recording medium web is transported a predetermined length along a transport direction by a transport motor at a first, relatively low speed. During this process, a sensor scans a predetermined area of the paper and sends scan signals to an evaluating unit. This evaluates the signals and checks whether they can be associated with a predetermined mark. The transport length between two successive marks is identified by the evaluating unit as the value for a page length. Finally, the print process is initiated at a second, relatively high transport speed and is controlled using the identified value for the page length.

The invention makes it possible that the drive for the recording medium web is synchronized to the page length even after a feed of one page. Therefore, position deviations of the web which arise due to imprecise insertion of the paper web or elevated slippage between the drive and the web are automatically compensated. The print process can then occur beginning with the second page already. Maculature, i.e. excess unprinted paper, is thus largely avoided. The printing ensues with positional precision in the blank with the first printed page already.

In particular, what is accomplished by the inventive start procedure is that the print process can begin with the first page following the page required for sensitizing the sensor.

The invention is particularly suited to application in a printing system comprising two structurally identical printers that are connected in series, in which the second printer processes the paper web output by the first printer online; that is, without a significant time delay. In this type of system, known as a twin printing system, the second printer prints the paper web output by the first printer optionally on the verso or on the same side, with a different color, for instance. The two printers can be provided with a tractor drive or with a tractorless friction drive for transporting the recording medium. During the print process, the second printer scans the marks printed by the first printer in order to regulate its processing speed in such a way that the print formats are superimposed exactly, or, that the printers work synchronously to one another.

In a twin printing system such as this, it is particularly advantageous to adapt the measurement surface in the second printer precisely to the print color of the first printer. If the first printer is capable of printing a limited number of print colors, a set of measurement surfaces that are identical to the print colors of the first printer can be made available in the second printer.

But the measurement surfaces can also be applied on the recording medium as a gray value and/or as a stripe pattern by the first printer and scanned in the second printer.

The inventive procedure can be substantially automated. This rules out the possibility of operator errors in the insertion of the web-shaped recording medium into the printer, or, this makes it possible to compensate such errors. The process only requires a small amount of time, and so the effective printing time of the printer is high. When the sensor is shifted using a motor drive, the degree of automation of the processes can be increased still further.

Figure 1:
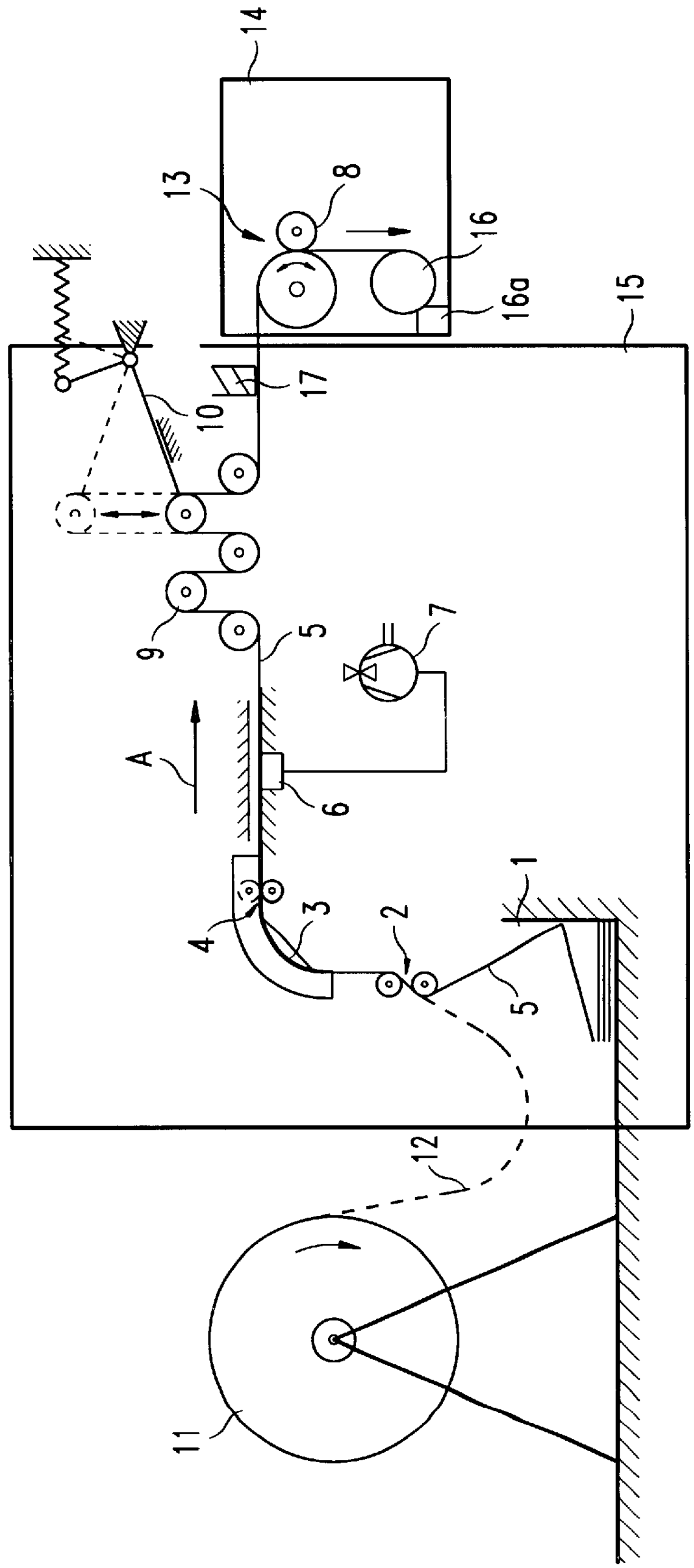
FIG. 1 illustrates a printer with a tractorless paper drive.

The printer device represented in FIG. 1 draws a band-shaped recording medium (paper) from a paper input receptacle 1 or from a supply roll 11. In the roll operation, the paper web 5 is fed to a guide mechanism 2 via a loop 12 and is then fed in a web precentering device 3 to friction drive rolls 4 along a seating edge. Next, it is drawn by a drive 8 via an under-pressure brake 6, which is connected to a vacuum pump 7 that generates the under-pressure. The paper web 5 is braked by the under-pressure, increasing the tension of the paper web. The higher the tension is, the more stably the paper web 5 runs in the transport direction A; that is, the less it slides out of the desired paper transport direction laterally. Following the under-pressure brake 6, the paper web 5 passes through a stabilizing zone, which is formed of several guide rolls 9 and a loop draw 10. The paper web surrounds the guide rolls 9 at least 180°, stabilizing the paper web laterally even more.

Before the paper web 5 is fed to a print assembly 14, a sensor arrangement 17 scans the paper optically. The sensor arrangement 17 is laid out such that it can scan the widest paper that can be processed in the printer over its entire width. The width of the sensor arrangement is thus adapted both to the mechanical components for paper transport and to the parameters of the printing device 14 on the recording side, which determine the printable width. It is suited to the width of a photoconductive drum 16, in particular. In the present exemplifying embodiment, the processible paper width ranges from 6.5 inches (165 mm) to 19 inches (482.6 mm). Details of the sensor arrangement 17 are described in DE-U-297 23 879 (internal file number 971101).

From the sensor arrangement 17, the paper web 5 is fed to a transfer station via a drive assembly 13. In this exemplifying embodiment, the transfer station comprises a photoconductive drum 16, which works in conjunction with a corotron device 16*a*. The photoconductive drum 16 is charged with information by light in known fashion, a charge image being thus applied. It then picks up a magnetized toner, which is transferred to the paper web 5 in the print transfer area. Next, the corotron device 16*a* discharges the corresponding area of the photoconductor drum again, so that this can be written with information again. The corotron device 16*a* operates in known fashion, as described in EP 0 224 820 B1.

In the illustrated example, the sensor arrangement 17 is arranged in the region of the paper feed 15, though it can also be provided inside the print assembly 14. The paper web 5 is transported in the paper transport device A.

Figure 2:
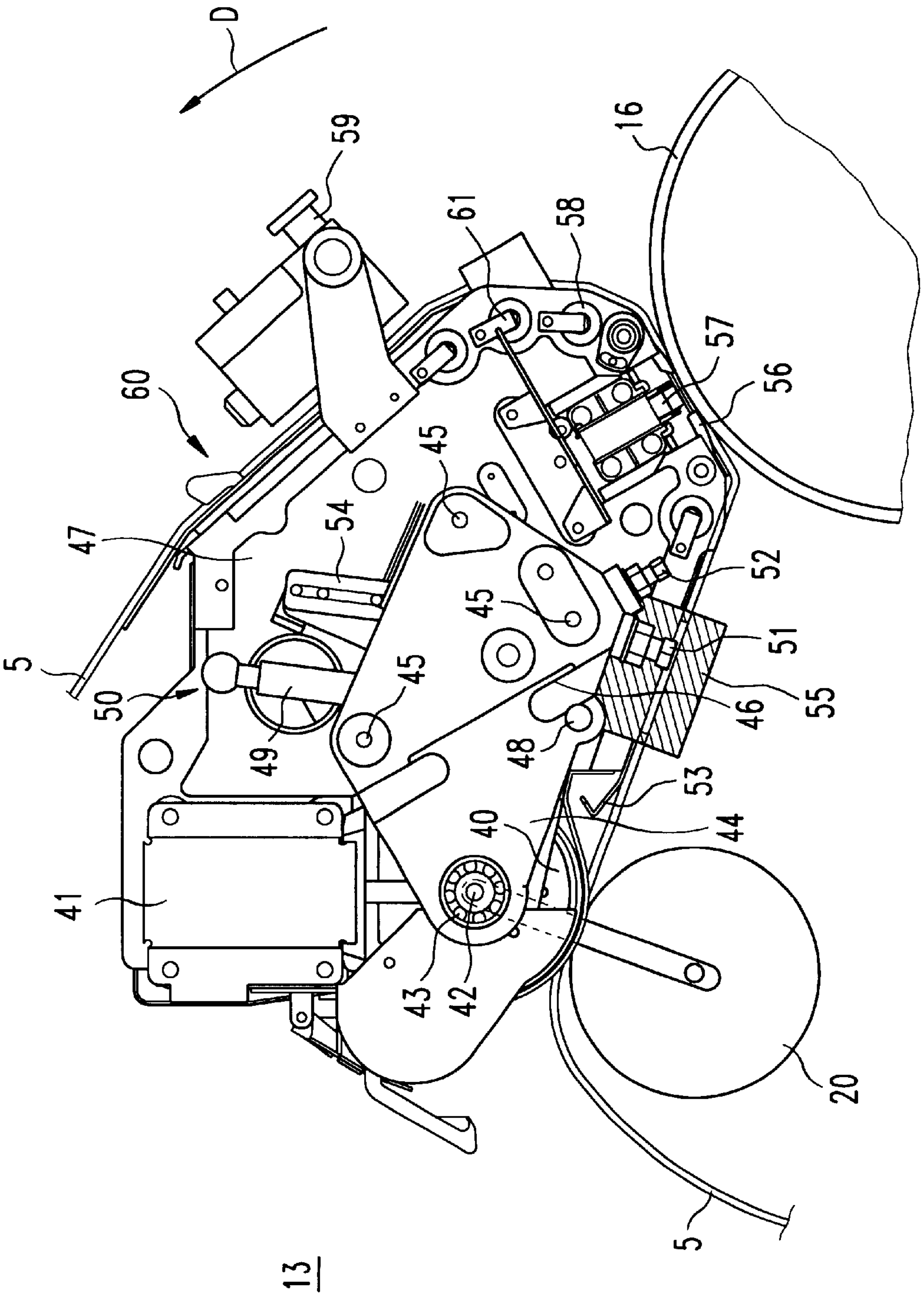
FIG. 2 shows a section through a drive assembly.

FIG. 2 more closely shows the drive assembly 13 that is arranged in the region of the print transfer station or, the photoconductive drum 16 of the electrographic printer.

At the drive roller 40, a roll arrangement 20 presses with the prescribed springing force. As a result, the paper that is being transported through between the rolls 40 and 20 is moved by the drive roller 40 by means of friction. The drive roller 40 is connected to the step motor 41 via a toothed gear drive, in turn. The overall drive assembly 25 is flanged to a printer housing via the bearing block 44. At the bearing block 44, a common bearing axle 42 is borne by the ball bearing 43, the axle receiving the rotational motion of the drive roller 40, on one hand, and making it possible for the drive elements to pivot about the axis B, on the other hand. To enable the pivoting motion, the drive components are mounted on a carrier plate 47, which is connected via a gas pressure spring 49 and via the bearing axle 42 to the bearing frame 44.

Threads 45 in the bearing frame 44 serve to receive fixing screws which are led through the printer housing 18. The overall drive assembly can be aligned within the printer housing via guide surfaces 46. The carrier plate 47 can be aligned in turn with respect to the bearing block 44, a first adjustment screw 51 and a second adjustment screw 52, at which the straight pins at the carrier side abut, being provided in the bearing frame 44.

The gas pressure spring 49 is connected to the carrier 47 by the threaded connection 50 and to the bearing frame 44 by the threaded connection 48. Carrier 47 and bearing frame 44 can be locked against one another using the lock mechanism 54.

A paper web which is inserted into the drive assembly 25 between the drive roller 40 and the counterpressure roller 20 is led by a guide plate 53 to a paper sensor 55. The paper sensor scans the paper over the entire width of the printable area of the photoconductive drum, by which process it is possible to detect the lateral paper edges as well as potential margin perforations of the paper web. In the region of the print transfer zone 5 of the print device, the paper is pressed by the spring-loaded pivot cheeks to the surface of the photoconductive drum 2. An electric corotron device 57, which is known per se, generates a high voltage, by which the toner that is located on the photoconductive drum is drawn to the paper. Guide rollers 58 guide the paper further to a mark sensor 59, which detects print or cut markers that may be present on the paper web. Grounded electrical connections 61 (antistatic plates) dissipate electrical residual charges that may be present on the paper.

When paper with margin perforations is transported using the paper transport, the margin perforation can be scanned using a pin feed wheel 60.

Figure 3:
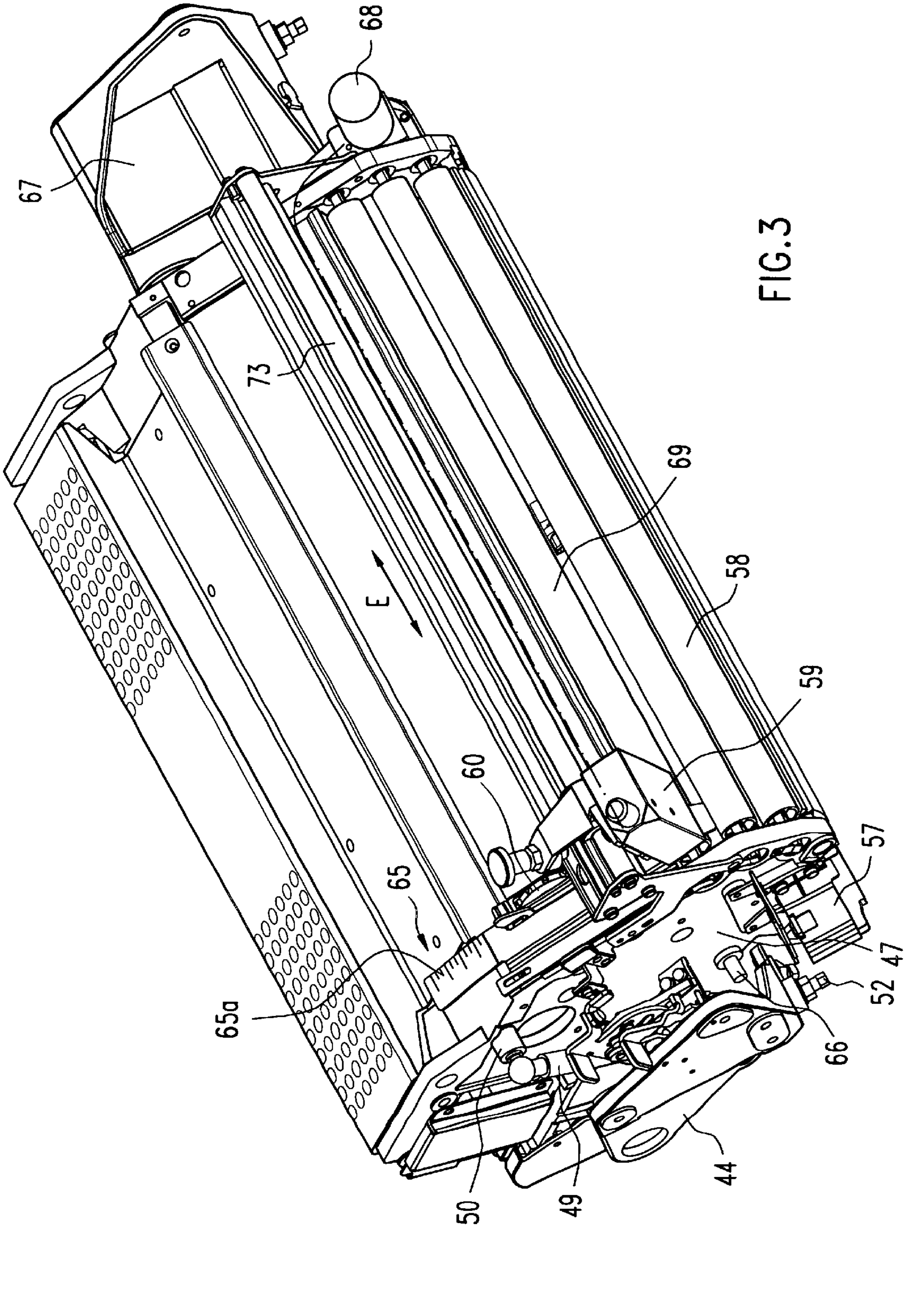
FIG. 3 is a view of the drive assembly.

FIG. 3 shows the paper drive 25 in a three-dimensional representation. Specifically, the straight pin 66 that is installed at the carrier plate 47 can be seen, which works in conjunction with the adjustment screw 52 that is screwed into the bearing frame 44, as well as the screw connection 50 of the gas-pressure spring 49.

Above the guide rollers 58, the paper is led by a guide surface 69. In this area, the scanning of the paper with the mark sensor 59 is also accomplished. Furthermore, a seating rule 65 is provided in this area, which is used for the printer's start process. Newly inserted paper which has margin perforations is seated with the beginning of a page at a mark 65*a* on the rule 65 (which corresponds to the page length); the margin perforation is engaged with the pin feed wheel 60, which has been pivoted in; and the print process is initiated. The pin feed wheel 60 is a component of a sensor arrangement which is described more closely in FIG. 4.

In the transfer area, a drive motor 68 draws a corotron wire corresponding to the width, which is to be printed, of the page from the corotron wire cassette 57. The mark sensor 59 can be displaced along the bar 73 in direction E. The plate 66 covers the drive motor 41 and serves in particular for electromagnetic shielding. Corresponding to the front bearing frame 44, a rear bearing frame 67 is also provided, which is likewise secured at the printer housing.

Figure 4:
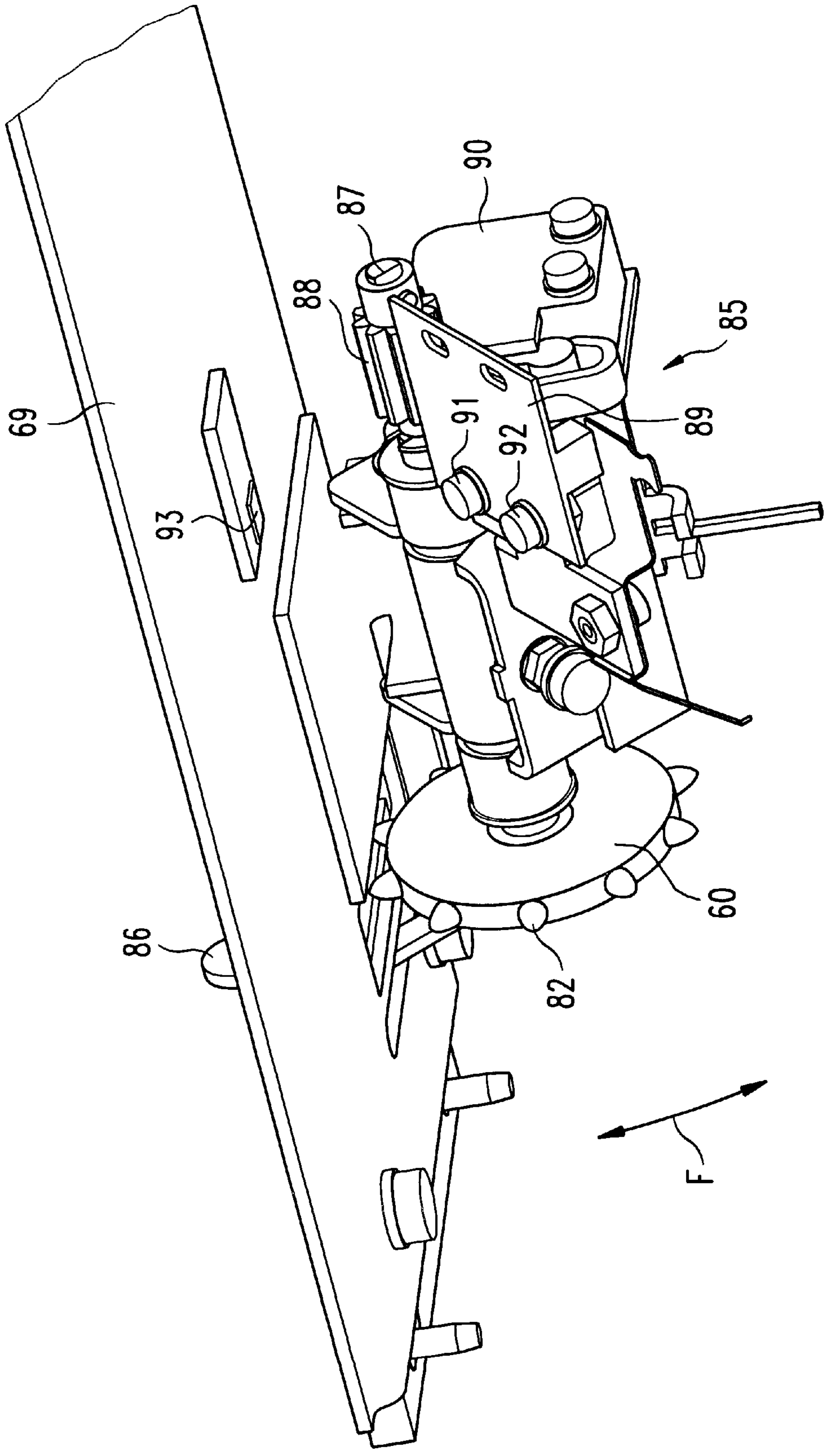
FIG. 4 illustrates a sensor arrangement.

FIG. 4 shows the pin feed wheel sensor 85, which comprises the pin feed wheel 60. In the position illustrated, the pin feed wheel is swivelled out; that is, the pins do not project out over the paper guide plane 67. This pin feed wheel 60 can be swivelled in and out in direction F using the actuating lever 86. The pin feed wheel 60 is mounted on an axle 87, which likewise bears a toothed gearwheel 88. A magnetoresistive sensor 91 detects impulses of the metal toothed gearwheels of the toothed gearwheel 88. These impulses can be unambiguously allocated to the rotational movement of the pin feed wheel 60, so that the scanning of the margin perforation of the paper can occur, this running across the paper plane 67 and engaging with the pin feed wheel 60. From these impulses, the speed of the paper web and its position in relation to the transport grid of the drive mechanism can consequently be computed. The signals of the sensor 85 are therefore used as input signals for an anti-slip control of the paper drive. The sensor assembly 89 is connected electrically to a device control (FIG. 5) for this purpose.

A second magneto-resistive sensor 92 detects whether the pin feed wheel sensor 85 is in the in or out position relative to the paper guide plane 67. For this purpose, it acts in conjunction with the magnet 93 that is mounted on the guide surface 67. Using a stop mechanism 90, the overall pin feed wheel sensor 85 can be held in the in or out position, respectively.

Figure 5:
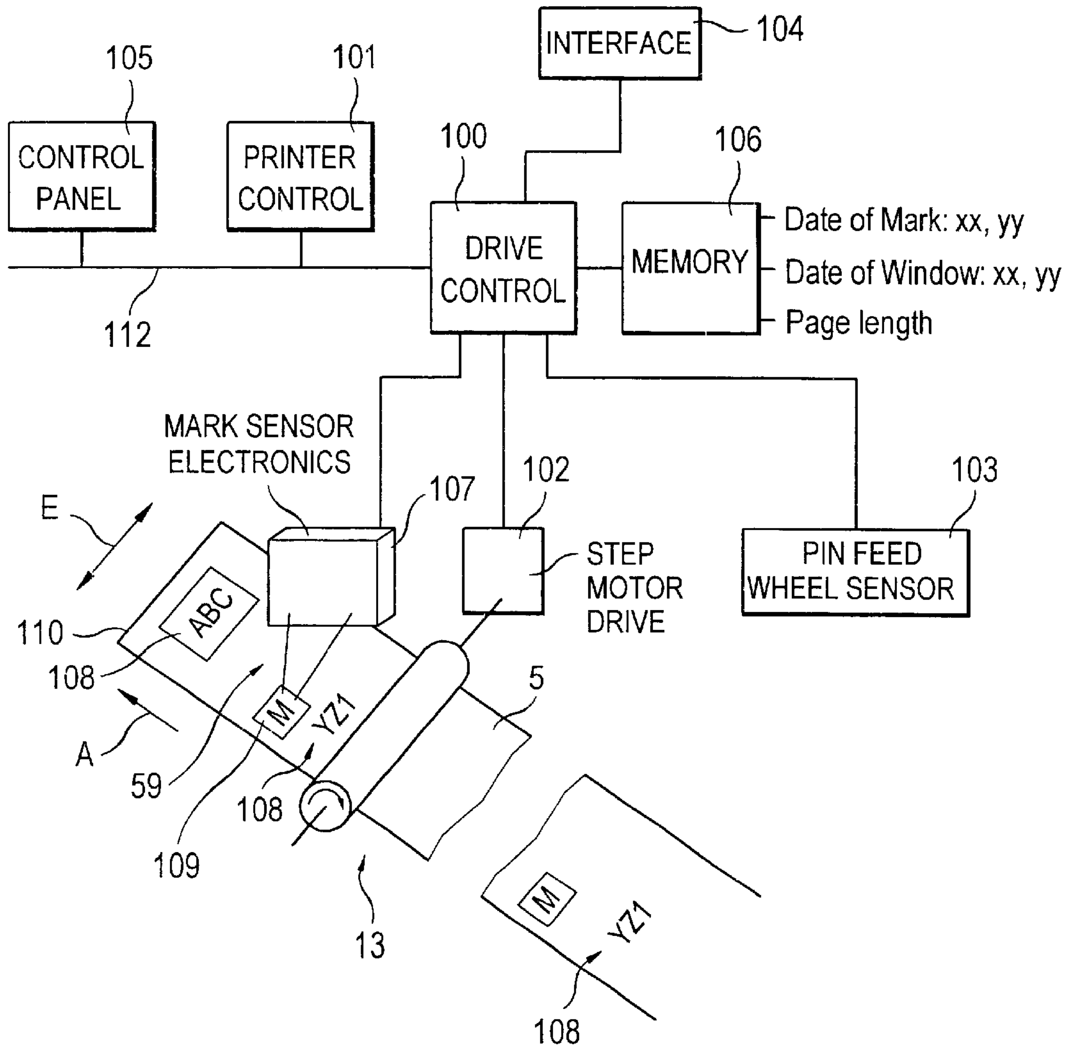
FIG. 5 is a block circuit diagram of the control of the drive.

FIG. 5 shows electronic components of the printer and their interaction with the drive mechanism and sensor system. The drive assembly 13 has a drive control 100 via a shared data bus 112, which is connected to the higher-ranking printer control 101. Operator instructions can be input via a control panel 105. The drive control 100 receives the signals of the paper width sensor 17, or, 55 via its interface 104. From these, it computes both the width and the type of the paper; that is, whether or not there are margin perforations. The drive control 100 also receives the scanning signals of the pin feed wheel sensor 85 via its electronics 103 and those of the mark sensor 59 via its electronics 107. From the signals of the components 103 or 107, respectively, the speed of the paper web 5 is computed in the drive control 100. The result is utilized for anti-slip control of the step motor drive 102. The desired speed signals are delivered by the printer control 101.

To prepare a print process (start mode) following the startup of the printer or the insertion of a new paper web, the following procedure is followed:

A paper web 5 is manually drawn into the printer through the various assembly components up to the drive assembly 13. There, the front edge 110 of the paper web 5 is threaded into the area of the rule 65 up to the guide surface 67.

If the paper web 5 has margin perforation, this is brought into contact with the spindles of the pin feed wheel 82 that has been pivoted in. If it paper web 5 does not have a perforation, the pin feed wheel 82 is pivoted into the out position.

In the area of the rule 65, the feed of the paper web 5 already occurs via the drive motor 41. The operator determines the direction of the feed (forward/reverse) in order to align the beginning of a page precisely to a mark on the rule 65 that corresponds to the page length. The feed occurs relatively slowly and in small grid increments.

In the case of margin-perforated paper, the transport increments in the start mode amount to only fractions of the hole grid spacing, which typically equals ⅙ in. (approx. 4.3 mm). For example, the stepwidth equals 1/20 grid spacings (approx. 0.21 mm). In this mode of transport, the speed or position of the paper is detected using the pin feed wheel sensor 85 and is compared to the speed or position of the drive motor.

A discrepancy between these two speeds or positions, for instance due to slippage, a crumpled paper web, or imprecisions in the drive rollers, is detected in this way and is compensated by the drive control 100 by additional advance (additional increments in the transport direction).

If paper without a margin perforation is used, the position and/or speed of the paper web 5 is scanned with the mark sensor 59, whose electronic components 107 deliver corresponding signals to the drive control 100. Other sensors which are known per se besides the above described sensor 50 can also be used to measure the speed, for instance the sensor described in DE 44 28 156 A1 or in U.S. Pat. No. 5,204,620.

Figure 6:
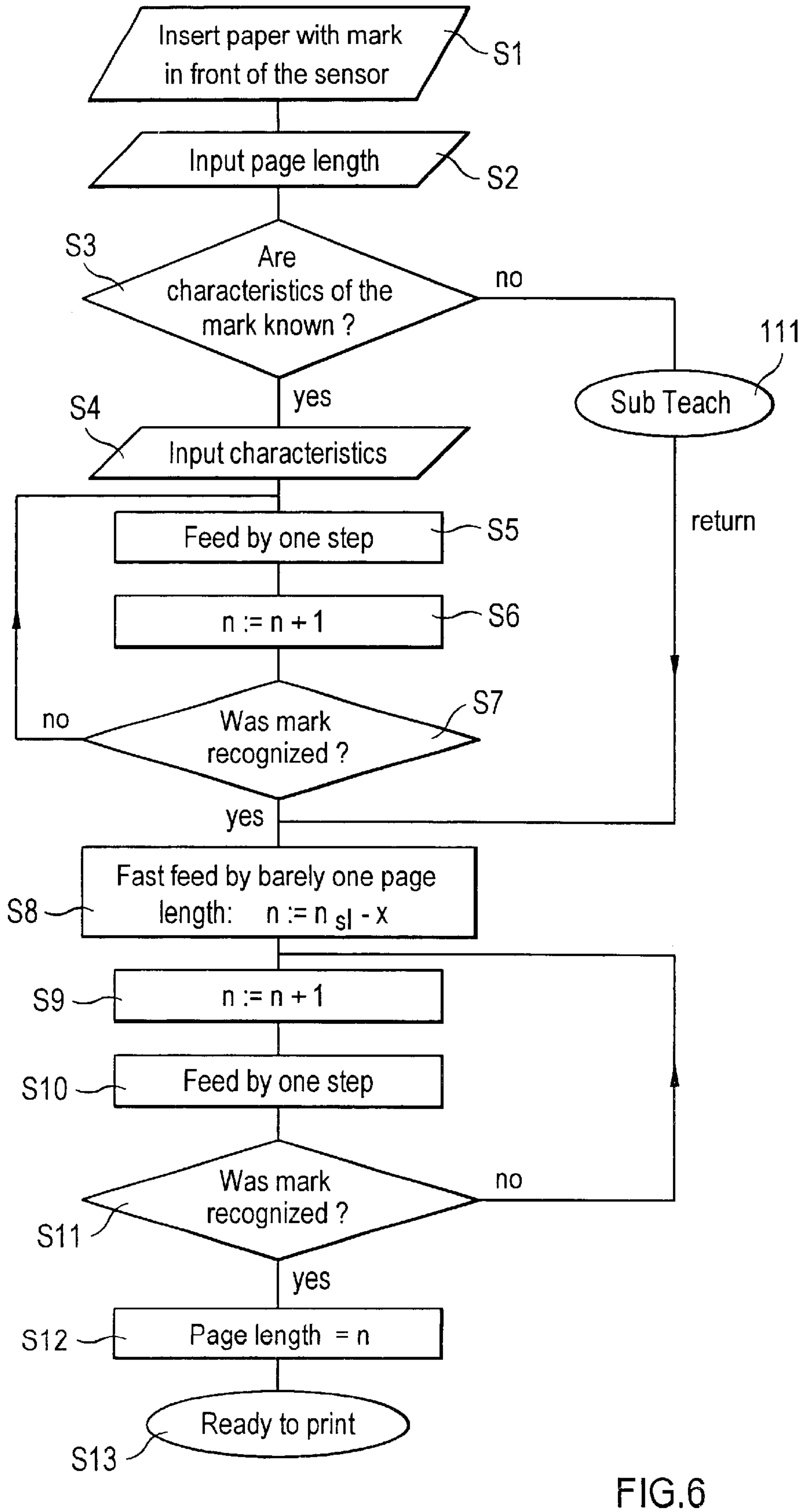
FIG. 6 is a flowchart of the control of the drive.
Figure 7:
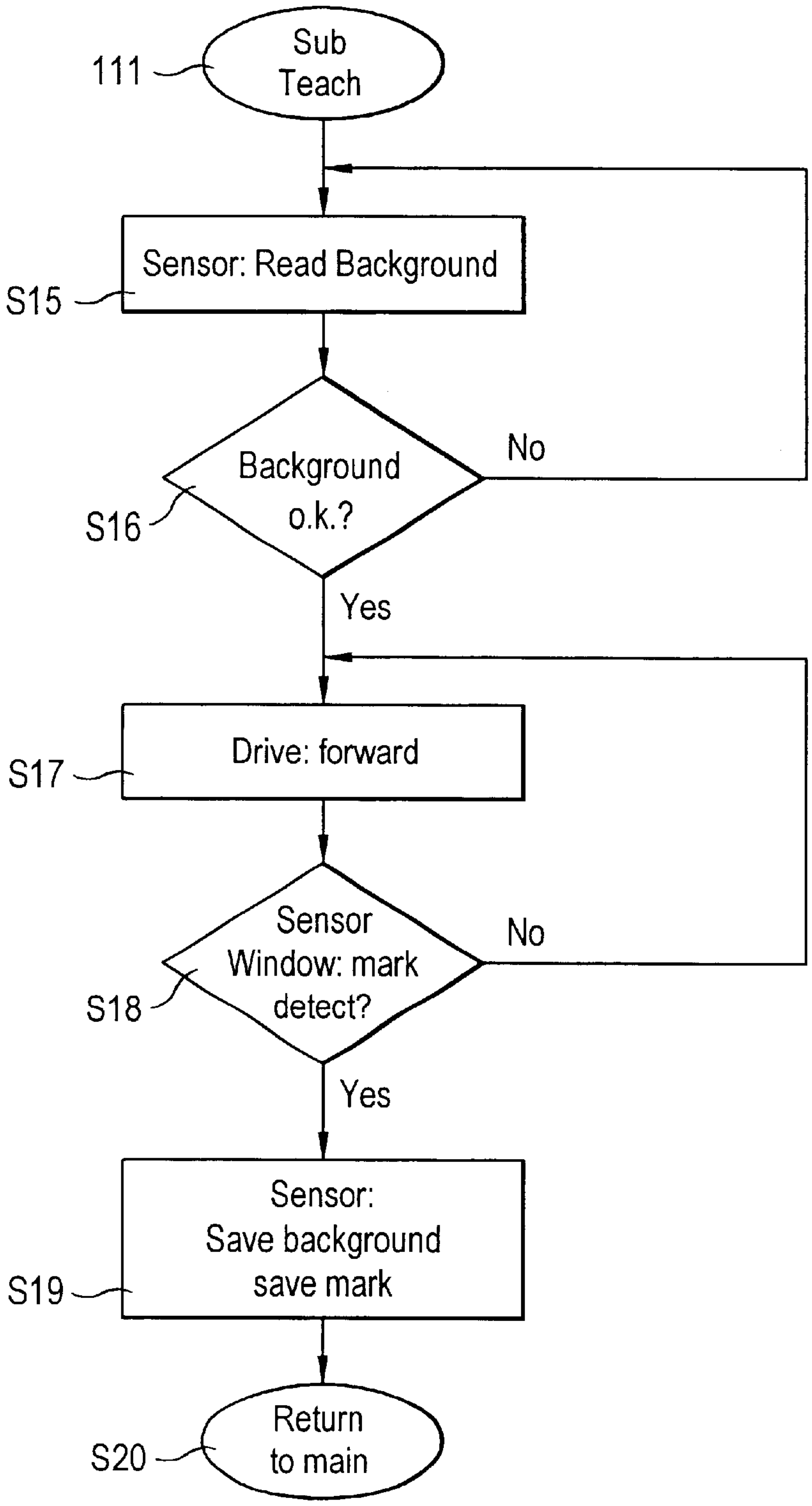
FIG. 7 shows a flowchart of the sensitizing of the sensor.

The procedure for properly inserting and transporting the paper and for sensitizing the mark sensor is described below with the aid of the FIGS. 5,6 and 7.

First, the paper web 5 is positioned approximately with its front edge 110 in the area of the sensor 59, or respectively, of the rule 65. The operator is allowed a ceratin tolerance here of several millimeters, for example, by which the position of the front edge (page beginning) of the paper web 5 may deviate from the desired position. A corresponding insertion mark 65*a* is provided on the rule 65 for the desired position. Different insertion specifications are possible for this. For example, the insertion mark can be located at different points on the rule, depending on the page length. Alternatively, it can be provided that a common insertion mark 65*a* is provided on the rule 65 for different page lengths. Finally the insertion marks can also be located directly under the sensor 59; that is, at its scanning point (Step S1). The page length on which the blank is based is then inputted at the control panel 105 of the printer, and the value is stored in the memory 106 (Step S2).

From the forms that have been preprinted on the paper web, a particular item of information is then selected, which is to serve as mark 109. Either this mark 109 can be an item of text or of graphic information, or it is possible to use an altered surface structure, for instance, a window cutout that is punched into the forms. The sensor 59 is adapted to the respectively selected mark information. In the present exemplifying embodiment, an optoelectronic sensor 59 having a high contrast sensitivity and a color sensitivity is used. If window cutouts were to be used as mark information, a mechanical scanning device or an ultrasound sensor could be suitable mark sensors. The item of information of the form which is used as mark 109 should occur only once per page of the form with respect to feed direction A. If the mark 109 occurs several times on one page of the form, then the evaluation electronics of the sensor 107, or respectively, the assembly control 100, must be capable of filtering out the repetitions within the page, so that the drive can be controlled precisely to the page beginning information.

If characteristic attributes of the mark 109 are known, such as the magnitude of the contrast transition, color of the background, color of the mark information, and so on, these can also be input via the control panel 105 and stored in the memory 106 (step S3, S4).

The information indicating the region of the form in which the mark 109 is located is also interrogated and stored, as warranted. A window in which the sensor responds to the mark information is thus defined within the form.

The specifying of a mark window also guarantees that the mark information is allocated page-exactly even when one and the same mark 109 occurs multiple times identically on one page of a form. The data transfer between the control panel 105, the higher-ranking printer control 101, and the assembly control 100 occurs via the data bus 112.

The characteristic data about the mark can also be loaded by the print control 101, to the extent that it receives this data from elsewhere. For example, the data can be co-delivered in the header region of a print job (job). An operator who configures this print job on a higher-ranking computer (print server) can add this information to the print job at this stage, thereby automatizing the print process still further once the print job comes in.

When the characteristic values of the mark are not known, an automatic procedure 111 is set in motion, with which the assembly control 100 detects and stores the characteristic values of the mark 109 fully automatically. This sensitizing process, as it is referred to, is described more closely later in connection with FIG. 7.

Returning to FIG. 6, an incremental advance of the drive 13 occurs in a very small grid, which corresponds to 1/60 of the hole spacing of margin-perforated paper. In this phase, the actual page length of a form on the paper web 5 is determined. With each feed increment (S5), a counter n is incremented by the value 1 (step S6), and a check is then performed as to whether the mark has been detected (step S7). If not, an advance of one increment is again made, and the counter n is again raised (steps S5, S6). If the mark has been detected, the page length value is extracted from the memory 106, and an advance of nearly one page length is performed; that is, an advance of a number of increments that is less than the number of increments of the page length ($n_{s1}$) by x (step S8).

Next, one increment is again advanced, respectively, and the increment counter n is raised by the value 1 (steps S9, S10). After this, it is again checked whether the next mark has been detected (step S11); if not, an advance is performed again and the count raised; if so, then the value n is kept as the current page length value and is stored in the memory 106 (step S12). Next, a message "ready to print" is generated (S13). Before the print process can be started on the photoconductive drum, the paper is positioned correctly with respect to the photoconductive drum 16 using the previously acquired values for the page length and the mark position.

By the method described, it is possible to compute both the precise position of the blank on the paper relative to the printing group and the actual length of the form, which is important for paper transport. With the precise information about the position of the forms and about the length of the forms, the print process can be started immediately with a highly precise fit.

To sensitize the sensor (FIG. 7), the sensor is first calibrated to the background of the paper web 5 in procedure 111. To accomplish this, the unprinted paper web is scanned by the sensor, and the sensor signals are read and temporarily stored (step S15). Next, it is checked whether the background information has a sufficiently large signal intensity (step S16). If not, sensor parameters such as amplification, illumination intensity, and so on, are modified, and step S15 is repeated until the sensor signals are sufficiently large. Next, the paper web 5 is moved forward in the recording direction (step S17) until the sensor detects a sufficiently large mark that is distinguishable from the background (step S18). If a mark cannot be fixed with sufficient precision in a predetermined number of feed increments, then the paper web 5 is withdrawn completely again, the settings at the sensor are changed, and a new search process is started. Here, the sensor settings are modified until the sensor detects a mark. The search process can be aborted by the user at any time. Besides the brightness of the light sources that are integrated in the sensor, their spectral distribution (red, green, blue) can also be modified. In this way, colored marks on a colored background can be reliably detected by the sensor. The computed values for the background and the marks are stored in the memory 106 (step S19). Following step S19, the start procedure is continued at step S8. For this purpose, an instructional command "return to main" is delivered (step S20).

During normal operation in which the print process in running, the paper web 5 is processed page by page, with complete pages always being printed. Slippage between drive 13 and paper web 5 is detected in this mode in the same way as in the start mode, but is not compensated by additional feed, but rather by a higher speed of the drive motor. When paper with margin perforation is used, the margin holes are continuously scanned by the pin feed wheel sensor 85, and the scan signals are used for anti-slip control. When paper without margin perforation is used, the mark is scanned page by page, and this scan result is used for anti-slip control. This page-by-page scanning can be used instead of or in addition to the scanning of the pin feed wheel sensor even given margin-perforated paper. It is critical in this page-by-page control variant that the drive 13 is precise enough that there are no excessively large shifts of the print format within a page at the page ends (or respectively, shortly before the mark of the next page).

If it is necessary to stop the printer from a running print operation, the drive control does not effectuate an immediate stop of the drive; but rather, a stop at the next page change. Because of this measure, the allocation of the increments of the drive motor to the scanned marks is maintained very effectively.

When the print process is continued following a print stoppage, the drive is first moved a few increments or even page lengths opposite the print transport direction A and then accelerated in direction A. The acceleration process can occur exactly corresponding to the movement of the start mode. Characteristic values related to the necessary feed compensation are thus likewise stored in the start phase and can be utilized in the continuation of an interrupted print process.

What these measures accomplish is that the print operation can be continued page-exactly following a print stoppage, and maculature is avoided. Since the page length of the paper web is known from the start operation, its value can be used again following a print stoppage. The procedure for determining the page length (FIG. 6) can then be forgone.

If it is necessary to reinsert the paper web 5 following a print stoppage, for instance after a paper tear, the following procedure is followed: first, the operator positions the new paper web 5 approximately in the insertion area 67 at the rule 65. Next, the paper web 5 is transported forward by the drive assembly 13 at a first speed, which is slow, until the mark sensor 59 detects a mark. With the aid of this detected mark position and of the page length that was detected before the print stoppage, the paper web 5 is again positioned in page exactly fashion with respect to the printing station 14, and the print process is continued.

In a still improved embodiment of the start mode, following the identification of two successive marks, the paper web is transported relative to the mark sensor back and forth between the detected marks once or several times. In this way, dynamic conditions in the acceleration of the paper web 5 can be more precisely computed, and the drive control in the acceleration phase can be improved still further. In particular, an optimal speed characteristic of the drive is calculated, by means of which slippage is extensively compensated. These values can be stored for specific jobs or specific papers, respectively, and used for additional regulation of the drive speed in a continuation following a print stoppage.

Using the signals of the paper width sensor 17, the drive control 100 can also determine whether and what kind of paper has been inserted in the printer. For this purpose, the drive motor is driven back and forth several times, and the sensor signals are evaluated. If one or more holes are detected, a perforated paper web is assumed. An automatic aligning to the hole grid can then ensue with the aid of the detected hole positions.

FIG. 8 shows different variants for sensitizing a mark sensor 59. In the variant shown in FIG. 8*a*, the mark 109 is scanned using the mark sensor 59 directly on the paper web 5. In the variant shown in FIG. 8*b*, a reference measurement surface 30 is pivoted in front of the mark sensor 59 instead of the mark, and this is scanned. The reference measurement surface 30 corresponds to the mark 109 with respect to shape, coloring and/or other criteria. From the set of predetermined mark parameters, a suitable measurement surface which corresponds to the mark of a current print job can be selected from several measurement surfaces that have been stocked in the printer. The selection of the suitable measurement surface can be controlled automatically by corresponding mark parameters that are defined within the print job, or can be manually initiated by the operator.

Figure 8A:
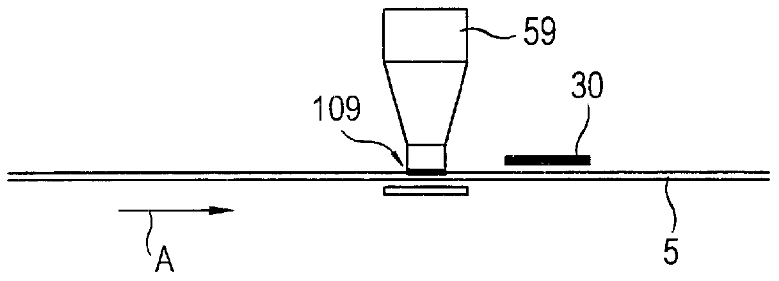
FIGS. 8*a*–8*e* illustrate different variants for scanning measurement surfaces.
Figure 8B:
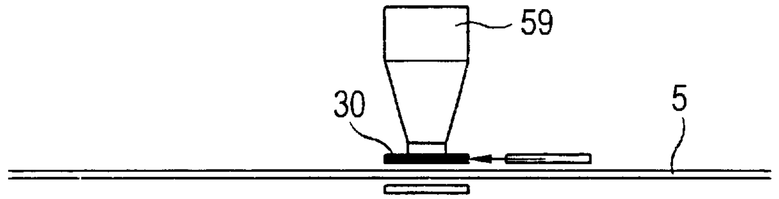
Figure 8C:
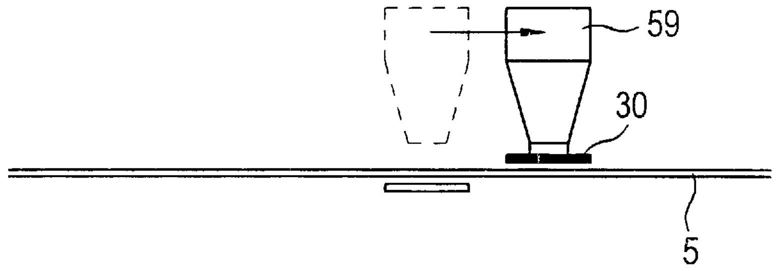
Figure 8D:
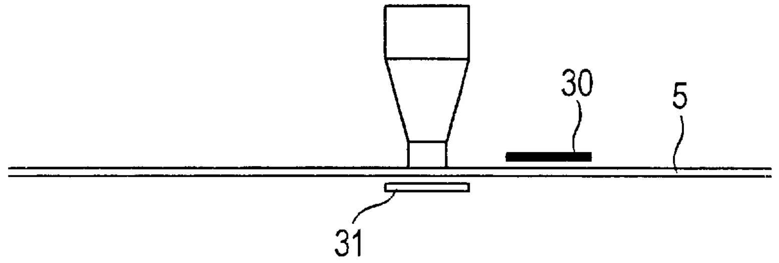
Figure 8E:
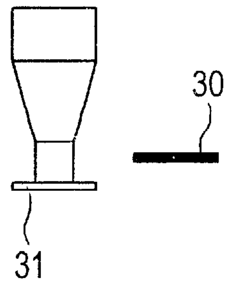

FIG. 8*c* shows a variation that corresponds to that described in FIG. 8*b*, although here, instead of the measurement surface 30 being moved in front of the mark sensor 59, the mark sensor 59 is pushed toward the measurement surface 30. To determine the background of the mark, the paper web 5 directly, or again a background measurement surface 31, can be moved in front of the mark sensor in accordance with the variant represented in FIG. 8*d*. The contrast, which is needed in order to detect the mark reliably, is determined from the measured values of the mark, or respectively, the mark measurement surface 30, and the value for the background. With the aid of this contrast value, correction parameters can also be set at the sensor 59, so that this can detect the mark reliably.

The determination of the mark parameters and/or of the contrast can be performed by the print control completely automatically if the measurement surfaces are positioned in front of the mark sensor with the aid of a drive, or if the sensor can be displaced automatically.

Figure 8F:
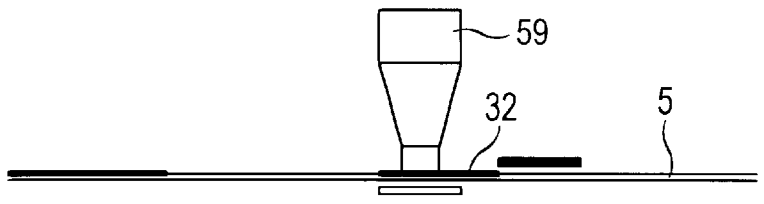
Figure 8G:
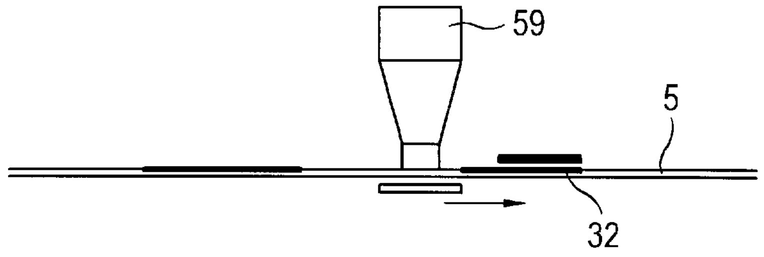

If a printed location of the paper were accidentally located in front of the sensor during the measurement of the background, such as the print format 32 in FIG. 8*f*, a faulty measurement would take place. This would become manifest in a poor contrast ratio. The print control can then move the paper web 5 in or against the transport direction A and repeat the measurement of the background at an unprinted location, as illustrated in FIG. 8*g*. The measurement result that delivers the best contrast ratio can then be used in the control process. In this method, it is not necessary that an operator positions both the unprinted paper and the preprinted mark immediately in front of the sensor and triggers, or respectively, performs the measurement. This facilitates and accelerates the sensitizing of the sensor and thus shortens the preparation time of the printer up to the start of printing. In the processing of a preprinted paper web, the operator can communicate the color of the preprinted mark to the printer system, for example. The print control can then immediately perform the sensitization (measurement) of the sensor to the paper web that is to be processed, or respectively, to the mark that is located on it, using a suitable measurement surface.

Figure 9:
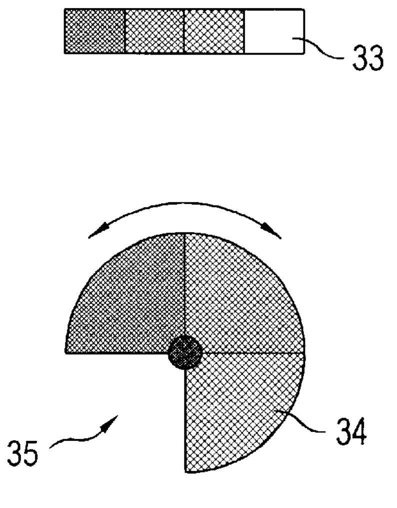
FIG. 9 shows embodiments of measurement surfaces.

FIG. 9 shows two examples of measurement surfaces, the measurement surface 33 being constructed linear and reproducing several segments with various shades of gray and/or colors. The measurement surface 34 has exactly such segments, as well as a void 35, which is provided for the scanning of the paper web 5 or the background measurement surface 31.

Figure 10A:
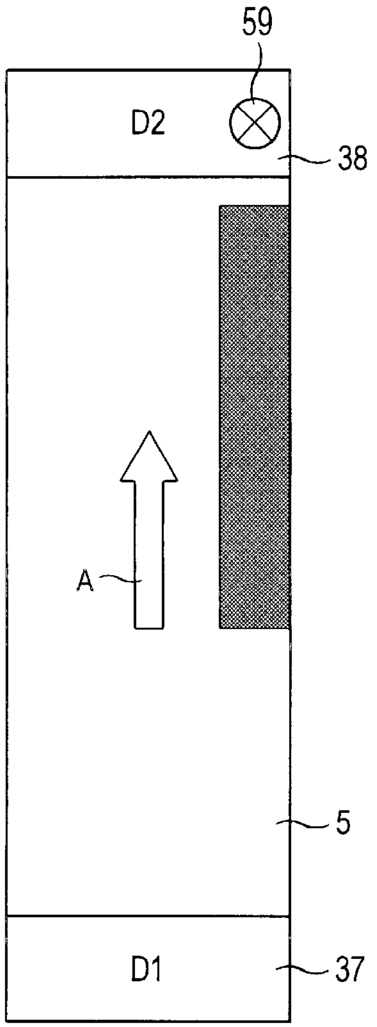
FIGS. 10*a*–10*b* different variants for scanning a recording medium.

FIG. 10*a* shows a first variation for determining the contrast on a paper web 5. A measurement surface 35 that is covered by a gray grid is printed on the paper web 5 by a first printer 37 and transported to a second printer 38. There, the mark sensor 59 scans the paper web 5. First, the sensor 59 scans the unprinted paper web 5 and stores the measured brightness background. Then the paper web 5 is transported from the first printer 37 to the second printer 38 until the measurement surface 35 is situated in front of the mark sensor 59 in the second printer 38. There, the brightness value of the printed surface 35 is measured, and the contrast of the bright (unprinted) surface and dark (printed) surface is stored. Lastly, the print control checks whether the contrast obtained is sufficient. If not, the sensitization process is repeated again, with the sensor parameters being set at greater sensitivity and/or the mark being printed again with a greater thickness, and with the initialization process being repeated.

Figure 10B:
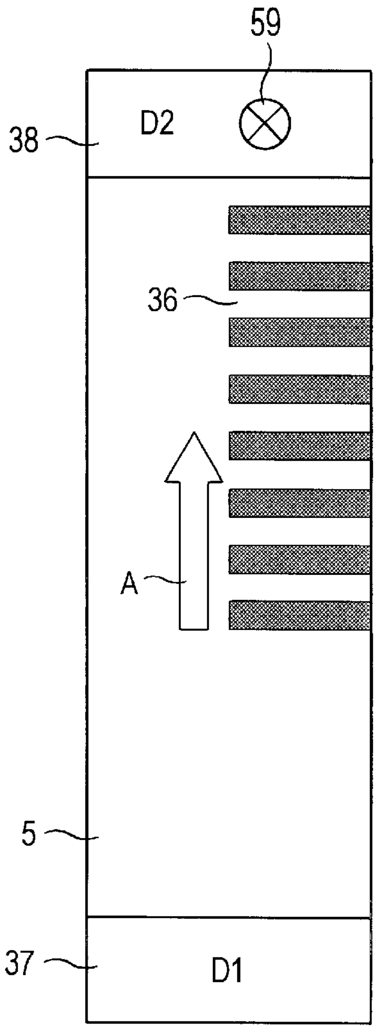

In the variation shown in FIG. 10*b*, an additional user intervention is required, though this does not require the insertion of unprinted paper in the second printer for the determination of the background value.

In the method represented in Fig. 10*b*, the first printer 37 prints a stripe pattern 36 on the paper web 5. At the same time, the second printer 38 advances the paper web 5 by the same length without printing, until the printed region is situated in the region of the mark sensor 59. The second printer 38 then positions the paper web so that an unprinted surface of the stripe pattern 36 is situated in front of the mark sensor 59. The brightness value of the unprinted paper is stored in this process. Next, the second printer 38 positions the paper web such that one of the previously printed stripes of the stripe pattern 36 is situated in front of the mark sensor 39. The second step of the sensitizing process is then performed: the brightness value of the printed paper is measured, and finally the contrast of bright and dark surfaces is stored. Lastly, it is rechecked whether the obtained contrast value is sufficient, or the measurement is repeated at other measurement positions, as warranted, until a sufficiently high contrast is achieved.

Figure 11A:
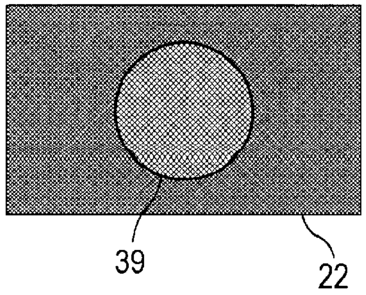
FIGS. 11*a*–11*b* shows a scanning surface of a mark sensor.
Figure 11B:
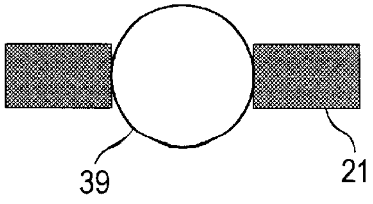

The printing of a gray grid in accordance with FIG. 10*a* can also be used to optimize the scanning surface of the mark sensor. As can be seen in FIG. 11*a*, the annular scanning surface 39 of the sensor 59 can detect a gray area 22. If black marks that do not cover the entire scanning surface of the sensor are printed in the print operation, in accordance with the embodiment 21 in FIG. 11*b*, then the brightness of the thin, line-shaped mark 21 that is detected by the sensor is approximately comparable to the brightness value of the gray surface of FIG. 11*a*. The scanning accuracy in the print operation is thus greater when a gray surface is used for the teach-in process instead of a black one. This is particularly advantageous when very narrow black lines are used in the print operation, which would hardly be possible to position with sufficient exactness during the teach-in process.

Although the invention was described primarily using exemplifying embodiments that utilize paper as the recording medium, it can also of course be applied in connection with other recording media, such as films. It is also not bound to a specific imaging means such as photoconductive drums, but can be utilized in connection with band-shaped transmission media such as photoconductive tapes or magnetographic means. Finally, the invention can be applied to printers based on other recording principles, for instance ink-jet printers or thermotransfer printers.

By providing several control marks on a page of a form, it would be possible to increase the control precision within a page for margin-perforated paper as well. Finally, using a motor drive which acts on the mark sensor transverse to the paper transport direction (direction E in FIG. 5) in the start mode, the sensor could detect the marks in this direction in space automatically. The automatization level and thus the operative reliability could thus be further increased.

An additional automatization can be achieved when the mark sensor 59 is displaced by motor along its axle 73 in direction E for its sensitization (FIG. 3).

Although various minor changes and modifications might be proposed by those skilled in the art, it will be understood that our wish is to include within the claims of the patent warranted hereon all such changes and modifications as reasonably come within our contribution to the art.

What is claimed is:

1. A method for controlling a drive assembly in an electrographic printer which transports a web-shaped recording medium that has been preprinted in pages, comprising the steps of:

selecting a recording medium which has been preprinted with information arbitrarily in pages;

scanning the recording medium continuously by a sensor during print operation;

selecting a regularly recurring mark from the preprinted information or from a surface structure of the recording medium;

sensitizing the sensor to the regularly recurring mark of the recording medium by setting sensor parameters; and regulating a transport speed of the recording medium using scanned sensor signals.

2. The method according to claim 1 wherein the mark is selected from the preprinted information of the recording medium.

3. The method according to claim 1 wherein for the sensitizing, at least one reference measurement surface is scanned which is not printed on the recording medium and which corresponds to the mark with respect to parameters that are to be scanned.

4. The method according to claim 3 wherein the reference measurement surface is optionally pivotable within the printer to a position in front of the sensor.

5. The method according to claim 3 wherein a second reference measurement surface is scanned which corresponds to unprinted recording medium.

6. The method according to claim 5 wherein a contrast value is computed from the scanning of the two reference measurement surfaces.

7. The method according to claim 1 wherein an optoelectronic sensor is used.

8. The method according to claim 1 wherein the mark is located in a print-capable area of the printer.

9. The method according to claim 1 wherein a surface structure in a form of a window cutout is used as the mark.

10. The method according to claim 1 wherein the mark is applied page by page.

11. The method according to claim 1 wherein to sensitize the sensor, first a background of the recording medium is scanned, and then the mark is scanned.

12. The method according to claim 1 wherein the sensor is sensitized spectrally.

13. The method according to claim 1 wherein for the sensitizing and/or to detect the marks following a first mark detected, the recording medium is transported with a predetermined speed; a window is prescribed within which sensor signals are detected, in particular a time window or a number of steps of a step motor is checked to determine whether the mark is detected within this window; and an error message is output when the mark is not detected within the time window.

14. The method according to claim 1 wherein for the sensitizing, a start area of the recording medium is seated at a predetermined starting position in the printer; and a drive assembly transports the recording medium from the starting position in a transport direction.

15. The method according to claim 1 wherein a friction drive is used as a drive assembly for the recording medium.

16. The method according to claim 1 wherein the mark is detected by the sensor page by page.

17. The method according to claim 1 wherein a control that is allocated to the sensor is used to which characteristic data about the mark is fed.

18. The method according to claim 17 wherein the characteristic data contain location information and/or spectral information.

19. The method according to claim 1 wherein the recording medium is first moved a specific length in a recording direction in order to sensitize the sensor to a specific mark, and it is moved in an opposite direction if the mark was not found during forward motion.

20. The method according to claim 19 wherein following an unsuccessful search for the marks in a predetermined area of the recording medium, sensor parameters are modified, and a new search for the mark is executed.

21. The method according to claim 1 wherein a sensor is provided whose coverage area can be modified transverse to a transport direction of the recording medium.

22. The method according to claim 1 wherein a sensor is used which is mounted such that it is displaced transverse to a transport direction, namely one which is motor-driven.

23. The method according to claim 1 wherein a camera that has topical resolution and that covers an entire width of the recording medium is utilized as the sensor, an evaluation range of the camera being limited.

24. The method according to claim 1 wherein a spectrally sensitizable sensor is used; and that input and/or a storage unit are used with aid of which a control unit of the sensor is fed mark-specific data.

25. The method according to claim 1 wherein several cycles of forward-reverse movements are executed, an adjustment value at the sensor being modified following each cycle.

26. A method for controlling a drive assembly in an electrographic printer which transports a web-shaped recording medium, comprising the steps of:

selecting a recording medium which has been preprinted with information in pages;

scanning the recording medium by a sensor during print operation;

selecting a recurring mark from the preprinted information or from a surface structure of the recording medium;

sensitizing the sensor to the recurring mark of the recording medium by setting at least one sensor parameter; and regulating a transport speed of the recording medium using scanned sensor signals.

27. A device for controlling a drive assembly in an electrographic printer which transports a web-shaped recording medium that has been preprinted in pages, comprising:

a sensor which scans the recording medium for regularly recurring marks and which scans the recording medium continuously during print operation;

a control device which regulates a transport speed of the recording medium using scan signals of the sensor;

a selection device with which a regularly recurring mark is selected from the recording medium which has been arbitrarily preprinted in pages; and a sensitizing device by which the sensor is sensitized to the regularly recurring mark by setting of sensor parameters.

28. A printing system, comprising:

a first printer and a second printer which print a web-shaped recording medium in succession, in which a mark that is made on the recording medium by the first printer is scanned in the second printer, and a result of the scan is utilized to control a drive assembly;

the web-shaped recording medium being preprinted in pages;

a sensor which scans the recording medium for regularly recurring marks and which scans the recording medium continuously during print operation;

a control device which regulates a transport speed of the recording medium using scan signals of the sensor;

a selection device with which a regularly recurring mark is selected from the recording medium which has been arbitrarily preprinted in pages; and a sensitizing device by which the sensor is sensitized to the regularly recurring mark by setting of sensor parameters.

29. A device for controlling a drive assembly in an electrographic printer which transports a web-shaped recording medium, comprising:

a sensor which scans the recording medium for recurring marks and which scans the recording medium during print operation;

a control device which regulates a transport speed of the recording medium using scan signals of the sensor;

a selection device with which a recurring mark is selected from the recording medium which has been preprinted in pages; and a sensitizing device by which the sensor is sensitized to the regularly recurring mark by setting of at least one sensor parameter.

* * * * *